United States Patent
Kimura et al.

(10) Patent No.: US 7,889,618 B2
(45) Date of Patent: Feb. 15, 2011

(54) OBJECTIVE OPTICAL ELEMENT AND OPTICAL PICKUP APPARATUS

(75) Inventors: Tohru Kimura, Hachioji (JP); Yuichi Atarashi, Hachioji (JP); Kiyono Ikenaka, Hino (JP); Kenji Ogiwara, Hachioji (JP); Eiji Nomura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 1498 days.

(21) Appl. No.: 11/222,073

(22) Filed: Sep. 9, 2005

(65) Prior Publication Data

US 2006/0077792 A1 Apr. 13, 2006

(30) Foreign Application Priority Data

| Sep. 15, 2004 | (JP) | ............................. 2004-268217 |
| Oct. 8, 2004 | (JP) | ............................. 2004-296782 |
| Oct. 12, 2004 | (JP) | ............................. 2004-297592 |

(51) Int. Cl.
*G11B 7/00* (2006.01)

(52) U.S. Cl. ................................ 369/112.08; 369/44.23

(58) Field of Classification Search ............. 369/112.08
See application file for complete search history.

(56) References Cited

U.S. PATENT DOCUMENTS

| 6,819,491 B2 * | 11/2004 | Takahashi et al. ....... 369/112.03 |
| 2004/0160885 A1 * | 8/2004 | Kimura ................... 369/112.09 |
| 2005/0111336 A1 * | 5/2005 | Tanaka et al. .......... 369/112.08 |

* cited by examiner

*Primary Examiner*—Jorge L Ortiz Criado
(74) *Attorney, Agent, or Firm*—Finnegan Henderson Farabow Garrett & Dunner

(57) ABSTRACT

A first phase structure corrects at least one of a spherical aberration due to a difference between a protective substrate thickness t1 and a protective substrate thickness t2 and a spherical aberration due to a difference between a first wavelength λ1 and a second wavelength λ2, and a second phase structure corrects at least one of a spherical aberration generated when the first wavelength λ1 is changed in a range of ±10 nm, a best image point movement generated when the first wavelength λ1 is changed in a range of ±10 nm, and a spherical aberration generated when environmental temperature is changed.

44 Claims, 1 Drawing Sheet

OBJECTIVE OPTICAL ELEMENT AND OPTICAL PICKUP APPARATUS

This application is based on Japanese Patent Application No. 2004-268217 filed on Sep. 15, 2004, No. 2004-296782 filed on Oct. 8, 2004, and No. 2004-297592 filed on Oct. 12, 2004, in Japanese Patent Office, the entire content of which is hereby incorporated by reference.

BACKGROUND OF THE INVENTION

The present invention relates to an optical pickup apparatus by which the recording and/or reproducing of the information can be compatibly conducted on different kinds of optical information recording media, and to an objective optical element.

Recently, in the optical pickup apparatus, the wavelength-shortening of the laser light source used as the light source for the reproducing of the information recorded in the optical disk, or the recording of the information in the optical disk is advanced, for example, a laser light source of the wavelength 400-420 μm, such as the blue violet semiconductor laser, or the blue violet SHG laser to conduct the wavelength conversion of the infrared semiconductor laser by using the second harmonic wave, is putting to a practical use. In the case where these blue violet laser light sources are used, when the objective lens of the same numerical aperture (NA) as DVD (Digital Versatile Disc) is used, the recording of the information of 15-20 GB becomes possible for the optical disk of 12 cm diameter, and when NA of the objective lens is increased to 0.85, the recording of the information of 23-25 GB becomes possible for the optical disk of 12 cm diameter. In the present specification, the optical disk and photo-magnetic disk using the blue violet laser light source are generally called as "high-density optical disk", hereinafter.

Hereupon, in the high-density optical disk for which the objective lens of NA 0.85 is used, because the coma generated due to the skew of the optical disk is increased, there is the lens whose protective layer is designed thinner than the case in DVD (0.1 mm to 0.6 mm of DVD), and in which the coma due to the skew is reduced. Hereupon, not only saying that the recording and reproducing of the information can be adequately conducted on such type of the high-density optical disk, it can not be said that a value as a product of the optical disk player/recorder is enough. In the present time, based on a actuality that DVD Or CD (Compact Disk) in which various information are recorded, is put in a market, it is not enough only that the recording/reproducing of the information can be conducted on the high-density optical disk, but, a fact that, for example, also for DVD or CD which is owned by the user, the recording/reproducing of the information can be adequately conducted in the same manner, can introduce to an actuality that a value of the product as the optical disk player/recorder for the high-density optical disk is enhanced. From such a background, it is requested that, while the optical pickup apparatus mounted in the optical disk player/recorder for the high-density optical disk keeps the compatibility also for any one of the high-density optical disk and DVD, further, CD, the apparatus has the performance which can adequately record/reproduce the information.

As a method by which, while the apparatus has the compatibility also for any one of the high-density optical disk and DVD, further, CD, the information can be adequately recorded/reproduced, a method by which the optical system for the high-density optical disk and the optical system for DVD or CD are selectively switched corresponding to the recording density of the optical disk for which the information is recorded/reproduced, is considered, however, because a plurality of optical systems are necessary, it is disadvantageous for the size reduction, and further, the cost is increased.

Accordingly, in order to simplify the structure of the optical pickup apparatus and to intend the cost reduction, also in the optical pickup apparatus having the compatibility, it is preferable that the optical system for the high-density optical disk and the optical system for DVD or CD are made in common and the number of optical parts constituting the optical pickup apparatus is reduced at most. Then, it is most advantageous for the simplification of the structure of the optical pickup apparatus, and for the cost reduction that the objective optical system arranged in opposite to the optical disk is made in common. Hereupon, in order to obtain the objective optical system common for a plurality of kinds of optical disks whose recording/reproducing wavelengths are different from each other, it is necessary that the phase structure having the wavelength dependency of the spherical aberration is formed in the objective optical system.

In the Patent Document 1, an objective optical system which has the diffractive structure as the phase structure, and can be commonly used for the high-density optical disk and the conventional DVD and CD, and an optical pickup apparatus in which this objective optical system is mounted are written.

[Patent Document 1] Europe Unexamined Patent No. 1304689

However, because the objective optical element used for the optical pickup apparatus by which the recording and/or reproducing of the information is compatibly conducted on 3 different optical disks written in the above Patent Document 1 is the structure in which the objective lens and the optical element in which the phase structure is formed are combined in the optical axis direction, it is comparatively large sized and weighted, and the burden of an actuator for driving it at the time of the tracking or focusing, is large, accordingly, there is a problem that it is necessary that a large sized actuator is used, and the size reduction or energy saving of the optical pickup apparatus is not intended.

SUMMARY OF THE INVENTION

The present invention is attained by considering the above problems and the object of the present invention is to provide an optical pickup apparatus which has the phase structure, and in which the objective optical system by which the recording and/or reproducing the information can be adequately conducted on 3 kinds of disks whose recording density is different, which includes the high-density optical disk using the blue violet laser light source, DVD and CD, is mounted, and by which the simplification of the structure and the cost reduction can be realized, and an objective optical element.

To attain the above object, the objective optical element written in item 1 is characterized in that: in the objective optical element of the optical pickup apparatus by which, when the first light flux of the first wavelength $\lambda 1$ emitted from the first light source forms the converged spot on the information recording surface of the first optical information recording medium whose protective substrate thickness is t1, the reproducing and/or recording information is conducted, and when the second light flux of the second wavelength $\lambda 2$ ($\lambda 1 < \lambda 2$) emitted from the second light source forms the converged spot on the information recording surface of the second optical information recording medium whose protective substrate thickness is t2 ($t1 \leq t2$), the reproducing and/or recording information is conducted, the objective optical element is an objective optical element of 1 group composition which is commonly used for the first and the second optical information recording media, and has 2 phase structures of the first phase structure and the second phase structure, and whose at least one surface is aspheric surface, at least one of the spherical aberration due to the difference between the protective substrate thickness t1 and the protective substrate thickness t2, or the spherical aberration due to the difference between the first wavelength $\lambda 1$ and the second wavelength $\lambda 2$, is corrected by the first phase structure, and at least one of the spherical aberration generated when the first wavelength $\lambda 1$ is changed in the range of $\pm 10$ nm, the best image point movement generated when the first wavelength $\lambda 1$ is changed in the range of $\pm 10$ nm, and the spherical aberration generated when the environmental temperature is changed, is corrected by the second phase structure.

When the objective optical element is made one-group composition, the size reduction of the actuator by the simplification of the manufacturing process, cost reduction, weight reduction can be attained. Further, the compatibility is made between the first optical information recording medium and the second optical information recording medium by the first phase structure, and at least one of the spherical aberration generated when the first wavelength $\lambda 1$ is changed in the range of $\pm 10$ nm, the best image point movement generated when the first wavelength $\lambda 1$ is changed in the range of $\pm 10$ nm, and the spherical aberration generated when the environmental temperature is changed, is corrected by the second phase structure, the objective optical element which is excellent for the recording/reproducing characteristic on the first optical information recording medium can be provided.

Incidentally, "a phase structure" means a structure to provide a phase difference between ring-shaped zones, and "to form a converged spot" means that a light flux converges to almost one point in the sense of geometrical optics on a condition that a wavefront aberration is less Marechal's criterion.

DETAILED DESCRIPTION OF THE PREFERRED EMBODIMENT

Figure 1:
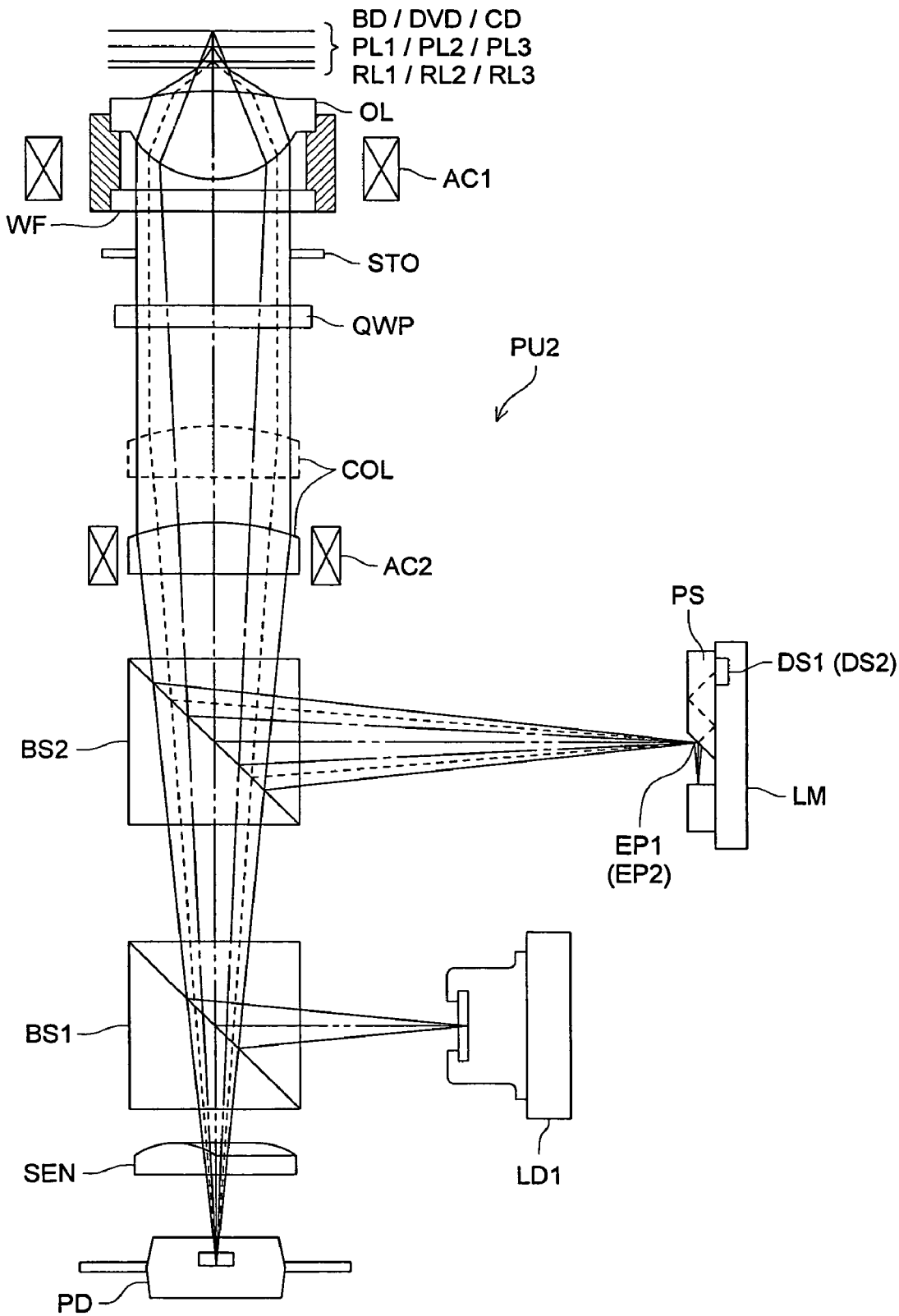
FIG. 1 is a drawing showing schematically the structure of first optical pickup device PU2.

In the present specification, optical disks (called also optical information recording media) using the blue violet semiconductor laser or the blue violet SHG laser as the light source for recording/reproducing of the information are generally called as "high-density optical disk", and other than an optical disk in which the recording/reproducing of the information is conducted by the objective optical system of NA 0.85 and the optical disk of the standard whose protective layer thickness is about 0.1 mm (for example, BD: Blue Ray Disk), an optical disk in which the recording/reproducing of the information is conducted by the objective optical system of NA 0.65 to 0.67 and the optical disk of the standard whose protective layer thickness is about 0.6 mm (for example, HD DVD: also simply called HD) is included. Further, it is assumed that, other than the optical disk having such a protective layer on its information recording surface, an optical disk having a protective film of the thickness of about several to several tens nm on the information recording surface, or an optical disk whose protective layer thickness or protective film thickness is 0, is also included. Further, in the present specification, it is assumed that, in the high-density optical disk, a photo-magnetic disk using, as the light source for recording/reproducing of the information, the blue violet semiconductor laser or the blue violet SHG laser is also included.

Furthermore, in the present specification, DVD is a general name of DVD series optical disks such as DVD-ROM, DVD-Video, DVD-Audio, DVD-RAM, DVD-R, DVD-RW, DVD+R, DVD+RW, and CD is a general name of CD series optical disks such as CD-ROM, CD-Audio, CD-Video, CD-R, CD-RW. The recording density is highest in the high-density optical disk, next, it is lowered in order of DVD, CD.

The objective optical element written in item 2 is characterized in that: in the inventions written in item 1, the first phase structure is a superimposed type diffractive structure in which patterns whose sectional shape including the optical axis is stair-shape, are concentric circularly arranged and for each number of a predetermined level surfaces, steps are shifted by the height for number of steps corresponding to the number of level surfaces, and the superimposed type diffractive structure has the wavelength selectivity which does not diffract the first light flux, but diffracts the second light flux.

"The superimposed type diffractive structure" means, for example, a structure in which at least one optical function surface is divided into a plurality of optical function areas around the optical axis, and at least one of the plurality of optical function areas is divided into ring-shaped areas around the optical axis, and a predetermined number of discontinuous steps are provided in each ring-shaped zone, and the ring-shaped zones in which discontinuous steps are provided are continuously arranged. The superimposed type diffractive structure is called also the multi-level structure, DOE structure, for example, the diffractive structure is a structure in which the optical function surface of the optical element is divided into a plurality of ring-shaped zones around the optical axis, and this ring-shaped zones are respectively formed in the saw-toothed manner, and in one saw-toothed part, a predetermined number of step shapes are further provided. Hereby, the diffraction action having the wavelength selectivity can be given to the optical element. Hereupon, the number of steps or the height, or width of the step of the step shape, can be appropriately designed. Specifically, it is written in Tokkaihei No. 9-306018. Here, "optically function surface" means a surface on which a light flux is refracted or diffracted so as to contribute to form a light spot.

When the superimposed type diffractive structure having the wavelength selectivity of the diffraction action written in item 2 as the first phase structure, is used, because the phase of the second light flux can be independently controlled, the spherical aberration to the second light flux can be finely corrected. As the result, the objective optical element which is excellent for the recording/reproducing characteristic on the second optical information recording medium can be provided.

Because the objective optical element written in item 3 is characterized in that: in the invention written in item 2, the optical path difference added to the first light flux by the step difference for one of the superimposed type diffractive structure is $2\times\lambda 1$, when the step difference for one of the superimposed type diffractive structure is set to the depth corresponding to 2 times of the first wavelength $\lambda 1$ in the optical path difference conversion, the high diffraction efficiency (transmission factor) also for the light flux of any wavelength can be secured.

The objective optical element written in item 4 is characterized in that: in the invention written in item 3, the predetermined number of level surfaces is 5. In the superimposed type diffractive structure, the diffraction efficiency of the light flux which receives the diffraction action depends on not only the step difference for one, but also on the number of level surfaces. When the number of level surfaces is set to 5, the diffraction efficiency of the second light flux can be increased to the maximum.

The objective optical element written in item 5 is characterized in that: in the invention written in item 1, the first phase structure is a saw-toothed diffractive structure, and when the diffraction order having the maximum diffraction light amount in the diffraction light generated when the first light flux is incident on the saw-toothed diffractive structure, is dor1, and the diffraction order having the maximum diffraction light amount in the diffraction light generated when the second light flux is incident on the saw-toothed diffractive structure, is dor2, it satisfies the following expression, and the objective optical element condenses the dor1-order diffraction light of the first light flux on the information recording surface of the first optical information recording medium, and condenses the dor2-order diffraction light of the second light flux on the information recording surface of the second optical information recording medium.

dor1>dor2, where, dor1 is even number.

Here, "saw-tooth shaped diffractive structure" means a structure that an optical function surface is divided into plural optical functional regions, at least one of the plural optical functional regions is divided into ring-shaped regions around the optical axis and each of the ring-shaped regions is provided with a predetermined number of discontinuous step differences and a sectional view in the optical direction is in a form of saw-tooth.

The saw-toothed type diffractive structure having the wavelength selectivity of the diffraction order written in item 5 may also be used as the first phase structure, in this case, it has the high diffraction efficiency for the light flux of any wavelength, and can finely correct the spherical aberration to the second light flux.

The objective optical element written in item 6 is characterized in that: in the invention written in item 5, the diffraction order dor1 is 2, and the diffraction order dor2 is 1. When the diffraction order dor1 of the first light flux is 2 and the diffraction order dor2 of the second light flux is 1, the correction characteristic of the spherical aberration to the second light flux can be made best.

The objective optical element written in item 7 is characterized in that: in the invention written in any one of items 1 to 6, the second phase structure is a saw-toothed diffractive structure, and when the diffraction order having the maximum diffraction light amount in the diffraction light generated when the first light flux is incident on the saw-toothed diffractive structure, is dor1', and the diffraction order having the maximum diffraction light amount in the diffraction light generated when the second light flux is incident on the saw-toothed diffractive structure, is dor2', it satisfies the following expression, and the objective optical element condenses the dor1'-order diffraction light of the first light flux on the information recording surface of the first optical information recording medium, and condenses the dor2'-order diffraction light of the second light flux on the information recording surface of the second optical information recording medium.

dor1'>dor2'.

When the saw-toothed type diffractive structure having the wavelength selectivity of the diffraction order as written in item 7 is used as the second phase structure, the high diffraction efficiency can be secured for the first light flux and the second light flux. Specifically, the combination of the diffraction order as written in items 84 to 86 may be used.

The objective optical element written in item 8 is characterized in that: in the invention written in item 7, the diffraction order dor1' is 2, and the diffraction order dor2' is 1.

The objective optical element written in item 9 is characterized in that: in the invention written in item 7, the diffraction order dor1' is 5, and the diffraction order dor2' is 3.

The objective optical element written in item 10 is characterized in that: in the invention written in item 7, the diffraction order dor1' is 10, and the diffraction order dor2' is 6.

The objective optical element written in item 11 is characterized in that: in the invention written in any one of items 1 to 6, the second phase structure is an optical path difference providing structure, and when n is natural number, the optical path difference added to the first light flux by the optical path difference providing structure is 5n times of the first wavelength $\lambda 1$, and the optical path difference added to the second light flux by the optical path difference providing structure is 3n times of the second wavelength $\lambda 2$.

The optical path difference providing structure having the wavelength selectivity of addition optical path difference as written in item 34 may be used as the second phase structure. Generally, because, in the optical path difference providing structure, the ring-shaped pitch can be secured larger than the saw-toothed type diffractive structure, the objective optical element whose light using efficiency is high can be provided.

"Optical path difference providing structure" is a structure constructed by plural ring-shaped zones divided with a fine step difference on a central region including the optical axis and the outside of the central region. The optical path difference providing structure has the following characteristics: At a predetermined temperature, the optical path difference providing structure generates an optical path difference corresponding to integral multiples of a wavelength of an incident light flux between wavefronts passing through neighboring ring-shaped zones, and when a temperature is changed from the predetermined temperature, a optical path difference generated between wavefronts passing through neighboring ring-shaped zones deviates from that corresponding to integral multiples of a wavelength of an incident light flux. The optical path difference providing structure is called also NPS (Non Periodic Surface) structure, phase structure.

The objective optical element written in item 12 is characterized in that: in the invention written in any one of items 1 to 11, the first phase structure is formed on the optical surface on the light source side, and the second phase structure is formed on the optical surface on the optical information recording media side. Hereby, the ring-shaped zone pitch of the first phase structure in which spherical aberration amount to be corrected is larger than the second phase structure can be secured large.

The objective optical element written in item 13 is characterized in that: in the invention written in any one of items 1 to 12, when the designed magnification to the first wavelength is m1, and the designed magnification to the second wavelength is m2, it satisfies the following expression.

m1=m2=0

When above expressions are satisfied, the coma generated by the tracking drive at the time of the recording/reproducing on the first optical information recording medium and the second optical information recording medium can be made zero.

The objective optical element written in item 14 is characterized in that: in the invention written in any one of items 1 to 13, it is made of low melting point glass whose transition point Tg is less than 400° C. When such low melting point glass is used, the life-elongation of the molding die can be intended, and because the viscosity at the time of melting is low, the phase structure can be finely transferred by the molding. As such low melting point glass whose transition point Tg is lass than 400° C., there is K-PG325, K-PG375 made by Sumita Kogaku Co.

The objective optical element written in item 15 is characterized in that: in the invention written in any one of items 1 to 13, it is made of resin. When the resin is used for the objective optical element, the mass production can be conducted with the stable performance and the low cost, and because it is light weight, the power consumption of the actuator for the focus drive or tracking drive requires small, and the size of the actuator can be reduced. Further, because the viscosity in the melting state is low, the phase structure can be finely transferred by the molding.

The objective optical element written in item 16 is characterized in that: in the invention written in any one of items 1 to 13, it is formed in such a manner that resin layer is pasted together to the surface of glass-made lens, and in the surface of the resin layer, the first phase structure or the second phase structure is formed. When the glass base material is used, the objective optical element whose temperature characteristic is excellent can be provided. Hereupon, as the material used as the resin layer, the ultraviolet ray hardening resin or thermo-hardening resin is suitable in the manufacturing.

The objective optical element written in item 17 is characterized in that: in the invention written in item 15 or 16, particles whose sign of the refractive index change rate following the temperature change is reverse to that of the resin, and whose diameter is less than 30 nm are dispersed in the resin.

When particles whose sign of the refractive index change ratio following the temperature change is reverse to that of the resin, and whose diameter is less than 30 nm are dispersed in the resin, the material, while keeping the moldability of resin, whose refractive index change following the temperature change is small is obtained. Hereby, the mass production can be conducted with the stable performance and low cost by the molding, and the objective optical element whose weight is light and whose refractive index change following the temperature change is small can be provided.

The optical pickup apparatus written in item 18 is characterized in that: in the optical pickup apparatus by which the reproducing and/or recording information is conducted when the first light flux of the wavelength $\lambda 1$ emitted from the first light source forms a converged spot on the information recording surface of the first optical information recording medium of the protective substrate thickness t1, the reproducing and/or recording information is conducted when the second light flux of the wavelength $\lambda 2$ ($\lambda 1 < \lambda 2$) emitted from the second light source forms a converged spot on the information recording surface of the second optical information recording medium of the protective substrate thickness t2 (t1≦t2), and the reproducing and/or recording information is conducted when the third light flux of the third wavelength $\lambda 3$ ($\lambda 2 < \lambda 3$) emitted from the third light source forms a converged spot on the information recording surface of the third optical information recording medium of the protective substrate thickness t3 (t2≦t3), the optical pickup apparatus has: the objective optical element of one group composition which is commonly used for the first to the third optical information recording media, which has the phase structure for correcting at least one of the spherical aberration due to the difference between the protective substrate thickness t1 and the protective substrate thickness t2, or the spherical aberration due to the difference between the first wavelength $\lambda 1$ and the first wavelength $\lambda 2$, and whose at least one surface is aspheric surface; and the diffractive optical element which is arranged in the common optical path of the first to third light fluxes, and patterns whose sectional shape including the optical axis is step-shape are concentric circularly arranged, and whose structure is a structure in which the step is shifted by the height for the number of steps corresponding to the number of level surfaces for each of the number of a predetermined level surfaces, and in which the superimposed type diffractive structure having the wavelength selectivity of the diffraction action by which the first light flux and the second light flux are not diffracted, but the third light flux is diffracted, is formed.

When both of the compatible function for the first optical information recording medium and the second optical information recording medium, and the compatible function for the first optical information recording medium and the third optical information recording medium, are given to the objective optical element, the highly functional objective optical element which can cope with the recording/reproducing on 3 kinds of optical information recording media is obtained, however, because the structure of the objective optical element becomes complicated, and the weight or the manufacturing cost is increased. Ordinarily, in the optical pickup apparatus, because the objective optical element is driven at high speed by the actuator, the increase of the weight of the objective optical element is a problem from the vie point that it introduces to the size-increase of the actuator or the increase of the amount of heat generation. Further, when the structure of the objective optical element becomes complicated, because, inevitably, the outer diameter of the objective optical element is increased, a problem that it can not be mounted in the thin type optical pickup apparatus, is caused.

Accordingly, in the optical pickup apparatus of the present invention, the compatible function of the first optical information recording medium with the second optical information recording medium is given to the objective optical element, and the compatible function of the first optical information recording medium with the third optical information recording medium is given to the diffractive optical element. Hereby, the objective optical element can be one group composition, and the simplification of the manufacturing process, cost reduction, weight reduction, size reduction of the objective optical element can be attained.

Further, when the compatible function of the first optical information recording medium with the third optical information recording medium is given to the diffractive optical element, it is most preferable in the design characteristic that the diffraction characteristic for selectively diffracting only the third light flux is given to the diffractive optical element. Specifically, when the superimposed type diffractive structure is applied in which patterns whose sectional shape including the optical axis is stair-shape, are concentric circularly arranged and for each number of a predetermined level surfaces, steps are shifted by the height for number of steps corresponding to the number of level surfaces, such a diffraction characteristic can be given.

The optical pickup apparatus written in 19 is characterized in that: in the invention written in item 18, the phase structure is the superimposed type diffractive structure in which patterns whose sectional shape including the optical axis is step-shape are concentric circularly arranged, and the step is shifted by the height for the number of steps corresponding to the number of level surfaces for each of the number of a predetermined level surfaces, and the superimposed type diffractive structure has the wavelength selectivity of the diffraction action by which the first light flux and the third light flux are not diffracted, but the second light flux is diffracted.

When the superimposed type diffractive structure having the wavelength selectivity of the diffraction action as written in item 19 is used as the first phase structure, because the phase of the second light flux can be independently controlled, the spherical aberration to the second light flux can be finely corrected. As the result, the optical pickup apparatus which is excellent for the recording/reproducing characteristic on the second optical information recording medium can be provided.

The optical pickup apparatus written in item 20 is characterized in that: in the invention written in item 19, the optical path difference added to the first light flux by the step difference for one of the superimposed type diffractive structure is $2 \times \lambda 1$.

When the step difference for one of the superimposed type diffractive structure is set to the depth corresponding to 2 times of the first wavelength $\lambda 1$ in the optical path difference conversion, the high diffraction efficiency (transmission factor) also for the light flux of any wavelength can be secured.

The optical pickup apparatus written in item 21 is characterized in that: in the invention written in item 20, the predetermined number of level surfaces is 5. The diffraction efficiency of the light flux receiving the diffraction action in the superimposed type diffractive structure depends on not only the step difference for one, but also on the number of level surfaces. When this number of level surfaces is set to 5, the diffraction efficiency of the second light flux can be increased to the maximum.

The optical pickup apparatus written in item 22 is characterized in that: in the invention written in item 18, the phase structure is a saw-toothed diffractive structure, and when the diffraction order having the maximum diffraction light amount in the diffraction light generated when the first light flux is incident on the saw-toothed diffractive structure, is dor1, the diffraction order having the maximum diffraction light amount in the diffraction light generated when the second light flux is incident on the saw-toothed diffractive structure, is dor2, and the diffraction order having the maximum diffraction light amount in the diffraction light generated when the third light flux is incident on the saw-toothed diffractive structure, is dor3, it satisfies the following expression, and the objective optical element condenses; the dor1-order diffraction light of the first light flux on the information recording surface of the first optical information recording medium; the dor2-order diffraction light of the second light flux on the information recording surface of the second optical information recording medium; and the dor3-order diffraction light of the third light flux on the information recording surface of the third optical information recording medium.

dor1>dor2≧dor3, where, dor1 is even number.

As the second phase structure, the saw-toothed type diffractive structure having the wavelength selectivity of the diffraction order as written in item 98 may also be used, and in this case, it has the high diffraction efficiency to the first light flux and the third light flux, and the spherical aberration to the second light flux can be finely corrected. As the result, the objective optical element which is excellent for the recording/reproducing characteristic on the second optical information recording medium can be provided.

The optical pickup apparatus written in item 23 is characterized in that: in the invention written in item 22, the diffraction order dor1 is 2, the diffraction order dor2 is 1, and the diffraction order dor3 is 1. Hereby, the correction characteristic of the spherical aberration to the second light flux can be made best.

The optical pickup apparatus written in item 24 is characterized in that: in the invention written in any one of items 18 to 23, the phase structure is formed on the optical surface on the light source side of the objective optical element. Hereby, the ring-shaped zone pitch of the first phase structure whose the spherical aberration amount to be corrected is abundant more than that of the second phase structure, can be secured large.

The optical pickup apparatus written in item 25 is characterized in that: in the invention written in any one of items 18 to 24, because the first light flux and the second light flux are incident on the objective optical element in the state of parallel light flux, the coma generated by the tracking drive at the time of the recording/reproducing on the first optical information recording medium and the second optical information recording medium can be made zero.

The objective optical element written in item 26 is characterized in that: in the invention written in any one of items 18 to 25, it is made of low melting point glass whose transition point Tg is less than 400° C. When such low melting point glass is used, the life-elongation of the molding die can be intended, and because the viscosity at the time of melting is low, the phase structure can be finely transferred by the molding. As such low melting point glass whose transition point Tg is lass than 400° C., there is K-PG325, K-PG375 made by Sumita Kogaku Co.

The objective optical element written in item 27 is characterized in that: in the invention written in any one of items 18 to 25, the objective optical element is made of resin. When the resin is used for the objective optical element, the mass production can be conducted with the stable performance and the low cost, and because it is light weight, the power consumption of the actuator for the focus drive or tracking drive requires small, and the size of the actuator can be reduced. Further, because the viscosity in the melting state is low, the phase structure can be finely transferred by the molding.

The objective optical element written in item 28 is characterized in that: in the invention written in any one of items 18 to 25, the objective optical element is formed in such a manner that resin layer is pasted together to the surface of glass-made lens, and in the surface of the resin layer, the phase structure is formed. When the glass base material is used, the objective optical element whose temperature characteristic is excellent can be provided. Hereupon, as the material used as the resin layer, the ultraviolet ray hardening resin or thermo-hardening resin is suitable in the manufacturing.

The objective optical element written in item 29 is characterized in that: in the invention written in item 27 or 28, particles whose sign of the refractive index change rate following the temperature change is reverse to that of the resin, and whose diameter is less than 30 nm are dispersed in the resin.

When particles whose sign of the refractive index change ratio following the temperature change is reverse to that of the resin, and whose diameter is less than 30 nm are dispersed in the resin, the material, while keeping the moldability of resin, whose refractive index change following the temperature change is small is obtained. Hereby, the mass production can be conducted with the stable performance and low cost by the molding, and the objective optical element whose weight is light and whose refractive index change following the temperature change is small can be provided.

The optical pickup apparatus written in item 30 is characterized in that: in the invention written in any one of items 18 to 29, the objective optical element further has the phase structure for correcting at least one of the spherical aberration generated when the first wavelength λ1 is changed in the range of ±10 nm, the best image point movement generated when the first wavelength λ1 is changed in the range of ±10 nm, and the spherical aberration generated when the environmental temperature is changed.

In the first phase structure, coexistence is made between the first optical information recording medium and the third optical information recording medium, and when at least one of the spherical aberration generated when the first wavelength λ1 is changed in the range of ±10 nm, the best image point movement generated when the first wavelength λ1 is changed in the range of ±10 nm, and the spherical aberration generated when the environmental temperature is changed, is corrected by the second phase structure, the objective optical element which is excellent for the recording/reproducing characteristic on the first optical information recording medium can be provided.

The optical pickup apparatus written in item 31 is characterized in that: in the invention written in any one of items 18 to 30, after the third light flux is converted to the divergent light flux by the superimposed type diffractive structure of the diffractive optical element, it is incident on the objective optical element. When the third light flux is converted to the divergent light flux by the superimposed type diffractive structure of the diffractive optical element, and is made incident on the objective optical element, the spherical aberration due to the difference between the protective substrate thickness t1 and the protective substrate thickness t3 can be corrected.

The optical pickup apparatus written in item 32 is characterized in that: in the invention written in item 31, Abbe's number in d-line of the superimposed type diffractive structure formed in the diffractive optical element is in the range of 40 to 80, and the optical path difference added to the first light flux by the step difference for one of the superimposed type diffractive structure is 5×λ1.

In the case where Abbe's number in d-line of the superimposed type diffractive structure is in the range of 40 to 80, when the step difference for one of the superimposed type diffractive structure is set to the depth corresponding to 5 times of the first wavelength λ1 in the optical path conversion, the optical path difference added to the second light flux by this step difference is 3 time of the second wavelength λ2. Hereby, the transmission factor to the fist light flux and the second light flux of the diffractive optical element can be increased, and the optical pickup apparatus which can cope with also the high-speed writing in the first optical information recording medium and the second optical information recording medium, can be provided.

The optical pickup apparatus written in item 33 is characterized in that: in the invention written in item 32, the predetermined number of level surfaces of the superimposed type diffractive structure is 2. When the number of level surfaces of the superimposed type diffractive structure is set to 2, the designed value of the diffraction efficiency of the third light flux can be made maximum.

The optical pickup apparatus written in item 34 is characterized in that: in the invention written in item 31, Abbe's number in d-line of the superimposed type diffractive structure formed in the diffractive optical element is in the range of 20 to 40, and the optical path difference added to the first light flux by the step difference for one of the superimposed type diffractive structure is 7×λ1.

In the case where Abbe's number in d-line of the superimposed type diffractive structure is in the range of 20 to 40, when the step difference for one of the superimposed type diffractive structure is set to the depth corresponding to 7 times of the first wavelength λ1 in the optical path difference conversion, the optical path difference added to the second light flux by this step difference is 4 times of the second wavelength λ2. Hereby, the transmission factor to the first light flux and the second light flux of the diffractive optical element can be increased, and the optical pickup apparatus which can cope with also the high-speed writing in the first optical information recording medium and the second optical information recording medium, can be provided.

The optical pickup apparatus written in item 35 is characterized in that: in the invention of item 34, in the superimposed type diffractive structure of the diffractive optical element, the predetermined number of level surfaces is 3 or 4. When the number of level surfaces of the superimposed type diffractive structure is set to 3 or 4, the designed value of the diffraction efficiency of the third light flux can be made maximum.

The optical pickup apparatus written in item 36 is characterized in that: in the invention of item 31, the diffractive optical element has the structure in which the material C whose Abbe's number in d-line is in the range of 45 to 65, and whose refractive index in d-line is in the range of 1.45 to 1.55, and the material D whose Abbe's number in d-line is in the range of 20 to 40, and whose refractive index in d-line is in the range of 1.55 to 1.70, are laminated in the optical axis direction, and the superimposed type diffractive structure is formed in the interface between the material C and the material D.

When the diffractive optical element is the structure as written in item 36, because the diffractive optical element whose transmission factor (diffraction efficiency) is high for the light flux of any wavelength is obtained, the optical pickup apparatus which can cope with also the high-speed writing in any optical information recording medium can be provided.

Because the optical pickup apparatus written in item 37 is characterized in that: in the invention written in item 36, the optical path difference added to the first light flux by the step difference for one of the superimposed type diffractive structure is 2×λ1, the designed value of the transmission factor (diffraction efficiency) of the light fluxes of respective wavelengths can be made maximum.

Because the optical pickup apparatus written in item 38 is characterized in that: in the invention written in item 37, in the superimposed type diffractive structure of the diffractive optical element, the predetermined number of level surfaces is 5 or 6, the designed value of the transmission factor (diffraction efficiency) of the light fluxes of respective wavelengths can be made maximum.

The optical pickup apparatus written in item 39 is characterized in that: in the invention written in any one of items 18 to 38, the diffractive optical element is a coupling optical element by which the divergent angle of the first flux is converted, and the flux is made incident on the objective optical element. When the function of the diffractive optical element is given to the coupling optical element by which the divergent angle of the first flux is converted and the flux is made incident on the objective optical element, the number of parts of the optical pickup apparatus can be reduced.

The optical pickup apparatus written in item 40 is characterized in that: in the invention written in any one of items 18 to 39, the diffractive optical element is a beam expander optical system by which the diameter of the first flux is converted, and the flux is made incident on the objective optical element. When the function of the diffractive optical element is given to the beam expander optical system by which the light flux diameter of the first flux is converted and the flux is made incident on the objective optical element, the number of parts of the optical pickup apparatus can be reduced.

The optical pickup apparatus written in item 41 is characterized in that: in the invention written in any one of items 18 to 40, the objective optical element conducts the tracking drive integrally with the diffractive optical element. Because the coma generated by the tracking drive at the time of recording/reproducing on the third optical information recording medium can be made zero, the good tracking characteristic can be obtained.

As for the optical pickup apparatus written in item 42, in the invention written in any one of items 18 to 41, because the optical pickup apparatus is characterized in that: it has the chromatic aberration correction optical element which is arranged in the optical path between the first light source and the objective optical element, and in which the diffractive structure for correcting the best image point movement of the objective optical element generated when the first wavelength λ1 is changed in the range of ±10 nm, is formed, the optical pickup apparatus which is excellent for the recording/reproducing characteristic on the first-optical information recording medium can be provided.

The optical pickup apparatus written in item 43 is characterized in that, in the invention written in item 42, the chromatic correction optical element is the same optical element as the diffractive optical element. When the function of the chromatic aberration correction element is given to the diffractive optical element having the compatible function of the first optical information recording medium with the third optical information recording medium, the number of parts of the optical pickup apparatus can be reduced.

The optical pickup apparatus written in item 44 is characterized in that: in the invention written in any one of items 18 to 43, because the optical pickup apparatus has a spherical aberration correction mechanism for correcting at least one of the spherical aberration generated in the objective optical element when the first wavelength λ1 is changed in the range of ±10 nm, and the spherical aberration generated in the objective optical element when the environmental temperature is changed, the allowance to the oscillation wavelength of the first light source can be enlarged, further, the usable temperature range can be spread.

Because the optical pickup apparatus written in item 45 is characterized in that: in the invention written in item 44, the spherical aberration correction mechanism has a moving optical element which can change the incident angle of the light flux on the objective optical element when the mechanism is moved in the optical axis direction, and the actuator for moving the moving optical element in the optical axis direction, when the moving optical element is moved in the optical axis direction and the spherical aberration is corrected, the correction range of the spherical aberration can be secured widely.

Because the optical pickup apparatus written in item 46 is characterized in that: in the invention written in item 45, the moving optical element is the diffractive optical element, when the diffractive optical element having the compatible function of the first optical information recording medium with the third optical information recording medium is moved in the optical axis direction, the number of parts of the optical pickup apparatus can be reduced.

The optical pickup apparatus written in item 47 is characterized in that: in the invention written in item 44, the spherical aberration correction mechanism is the liquid crystal element. When the spherical aberration is corrected by the liquid crystal element, because the movable part can be saved, it is advantageous for the size reduction of the optical pickup apparatus.

Because the optical pickup apparatus written in item 48 is characterized in that: in the invention written in any one of items 18 to 47, it further has an actuator for pendulum-driving the objective optical element, and when the recording/reproducing of the information is conducted on the third optical information recording medium, it follows the tracking drive of the objective optical element, and the objective optical element is pendulum-driven by the actuator, in the case where the recording/reproducing of the information is conducted on the third optical information recording medium, when the coma generated by the skew of the objective optical element and the coma generated by the tracking drive of the objective optical element, are cancelled each other, the good tracking characteristic is always obtained.

In the present specification, it is assumed that the objective optical element is, in the state that the optical information recording medium is loaded in the optical pickup apparatus, an optical element having the condensing action which is arranged in the position closest to the optical information recording medium side, and oppositely to this.

EFFECT OF THE INVENTION

According to the present invention, in the optical pickup apparatus in which the objective optical system is mounted, which has the phase structure and by which the recording and/or reproducing of the information can be adequately conducted on 3 kinds of disks whose recording densities are different each other, including the high density optical disk, DVD and CD using the blue violet laser light source, the optical pickup apparatus in which the structure can be simplified and cost can be reduced, and the objective optical element can be obtained.

Embodiment of the invention will be explained as follows, referring to the drawings. First, an objective optical element of the invention and an optical pickup device employing the objective optical element will be explained.

FIG. 1 is a diagram showing schematically a structure of optical pickup device PU2 capable of conducting recording and reproducing of information properly for any of high density optical disc BD, DVD and CD. Optical specifications of BD include first wavelength λ1=405 nm, protective layer thickness PL1 thickness t1=0.1 mm and numerical aperture NA1=0.85, optical specifications of DVD include second wavelength λ2=655 nm, protective layer thickness PL2 thickness t2=0.6 mm and numerical aperture NA2=0.65 and optical specifications of CD include third wavelength λ3=785 nm, protective layer thickness PL3 thickness t3=1.2 mm and numerical aperture NA3=0.51. However, a combination of the wavelength, the thickness of the protective layer and the numerical aperture is not limited to the foregoing.

The optical pickup device PU2 is composed of violet semiconductor laser LD1 that is driven when conducting recording and reproducing of information for BD and emits a violet laser light flux (first light flux) with a wavelength 405 nm, laser module LM having therein first light-emission point EP1 that is driven when conducting recording and reproducing of information for DVD and emits a red laser light flux (second light flux) with a wavelength 655 nm, second light-emission point EP2 that is driven when conducting recording and reproducing of information for CD and emits an infrared laser light flux (third light flux) with a wavelength 785 nm, first light-receiving portion DS1 that receives reflected light flux coming from information recording surface RL2 of DVD, second light-receiving portion DS2 that receives reflected light flux coming from information recording surface RL3 of CD and prism PS, photodetector PD for BD objective optical element OL, biaxial actuator AC1, uniaxial actuator AC2, collimator lens COL representing a coupling optical element or a movable optical element, first polarizing beam splitter BS1, second polarizing beam splitter BS2, sensor lens SEN for providing astigmatism to the reflected light flux coming from each of information recording surfaces RL1, RL2 and R13, quarter wavelength plate QWP, diaphragm STO corresponding to numerical aperture NA1 of BD and wavelength selecting filter WF. Incidentally, as a light source for BD, a violet SHG laser may also be used, in addition to the violet semiconductor laser LD1 stated above.

When conducting recording and reproducing of information for BD by the use of the optical pickup device PU2, a position of the collimator lens COL is adjusted by uniaxial actuator AC2 to the position shown with solid lines, so that the first light flux may be emitted from the collimator lens COL in the state of a parallel light flux. After that, the violet semiconductor laser LD1 is driven to emit light. An emergent light flux emitted from the violet semiconductor laser LD1 is reflected by the first polarizing beam splitter BS1, then, it passes through second polarizing beam splitter BS2, and passes through quarter wavelength plate QWP after being converted into parallel light flux by collimator lens COL, and thereby, is converted into circularly polarized light from linearly polarized light, as its light path is drawn with solid lines in FIG. 1. Then, it is regulated in terms of a diameter, and passes through wavelength selecting filter WF, to become a spot that is formed by objective optical element OL on information recording surface RL1 through protective layer PL1 of BD. The objective optical element OL is subjected to focusing and tracking conducted by biaxial actuator AC1 arranged around the objective optical element OL.

A reflected light flux modulated by information pits on information recording surface RL1 passes again through objective optical element OL and diaphragm STO, then, passes through quarter wavelength plate QWP to be converted from circularly polarized light into linearly polarized light, to be converted by collimator lens COL into a converged light flux. After passing through the second polarizing beam splitter BS2 and the first polarizing beam splitter BS1, the light flux is given astigmatism by sensor lens SEN and is converged on the light-receiving surface of photodetector PD. Thus, information recorded on BD can be read by the use of output signals of the photodetector PD.

Further, when conducting recording and reproducing of information for DVD by the use of the optical pickup device PU2, a position of the collimator lens COL is adjusted by uniaxial actuator AC2 to the position shown with dotted lines, so that the second light flux may be emitted from the collimator lens COL in the state of a parallel light flux. In this case, the position of the collimator lens COL is closer to objective optical element OL than that in the occasion where recording and reproducing of information are conducted for BD. After that, the first light-emission point EP1 is driven to emit light. As its light path is drawn with broken lines in FIG. 1, an emergent light flux emitted from the first light-emission point EP1 is reflected by prism PS and by the second polarizing beam splitter BS1, and it passes through quarter wavelength plate QWP after being converted into parallel light flux by collimator lens COL, and thereby, is converted into circularly polarized light from linearly polarized light. Then, it is regulated in terms of a diameter by wavelength selecting filter WF to become a spot that is formed by objective optical element OL on information recording surface RL2 through protective layer PL2 of DVD. The objective optical element OL is subjected to focusing and tracking conducted by biaxial actuator AC1 arranged around the objective optical element OL.

A reflected light flux modulated by information pits on information recording surface RL1 passes again through objective optical element OL and wavelength selecting filter WF, then, passes through quarter wavelength plate QWP to be converted again from circularly polarized light into linearly polarized light, to be converted by collimator lens COL into a converged light flux. After being reflected by second polarizing beam splitter BS2 and reflected twice in prism PS, it is converged on the first light-receiving portion DS1. Thus, information recorded on DVD can be read by the use of output signals of the first light-receiving portion DS1.

Further, when conducting recording and reproducing of information for CD by the use of the optical pickup device PU2, a position of the collimator lens COL is adjusted by uniaxial actuator AC2 to the position (shown with dotted lines in FIG. 1) that is the same as in the occasion where recording and reproducing of information is conducted for DVD.

After that, the second light-emission point EP2 is driven to emit light. As its light path is drawn with one-dot chain lines in FIG. 1, an emergent light flux emitted from the second light-emission point EP2 is reflected by prism PS and by the second polarizing beam splitter BS1, and it passes through quarter wavelength plate QWP after being converted into diverged light flux by collimator lens COL, and thereby, is converted into circularly polarized light from linearly polarized light. Then, it is regulated in terms of a diameter by wavelength selecting filter WF to become a spot that is formed by objective optical element OL on information recording surface RL3 through protective layer PL3 of CD. The objective optical element OL is subjected to focusing and tracking conducted by biaxial actuator AC1 arranged around the objective optical element OL.

A reflected light flux modulated by information pits on information recording surface RL1 passes again through objective optical element OL and wavelength selecting filter WF, then, passes through quarter wavelength plate QWP to be converted again from circularly polarized light into linearly polarized light, to be converted by collimator lens COL into a converged light flux. After being reflected by second polarizing beam splitter BS2 and reflected twice in prism PS, it is converged on the second light-receiving portion DS2. Thus, information recorded on CD can be read by the use of output signals of the second light-receiving portion DS2.

Both sides of the objective optical element OL in the present embodiment are aspheric, and a serrated diffractive structure is formed on an aspheric surface that is closer to the light source. This serrated diffractive structure is a phase structure for correcting spherical aberration caused by a difference of a protective layer thickness of BD and that of DVD, and diffraction order number dor1 having the maximum amount of diffracted light among diffracted light generated when the first light flux enters is made to be 2, diffraction order number dor2 having the maximum amount of diffracted light among diffracted light generated when the second light flux enters is made to be 1, diffraction order number dor3 having the maximum amount of diffracted light among diffracted light generated when the third light flux enters is made to be 1, and the manufacturing wavelength (blazed wavelength $\lambda B$) is made to be 405 nm.

A diffraction efficiency of the serrated diffractive structure wherein a wavelength-dependency for the diffraction order number is determined is high for any light flux with any wavelength, exemplifying that the diffraction efficiency is 100% for the first light flux, 88.3% for the second light flux and 100% for the third light flux.

Both sides of the collimator lens COL in the present embodiment are aspheric, and a superposed type diffractive structure is formed on an aspheric surface that is closer to an optical disc. This superposed type diffractive structure has wavelength selectivity for diffraction actions wherein the first and second light fluxes are not diffracted and the third light flux is diffracted, and is a structure wherein one step is established to the depth corresponding to a length that is 7 times the first wavelength $\lambda 1$ when converted into an optical path difference, the number of level surfaces formed in each pattern is made to be 4, and a step is shifted by a height for three steps corresponding to 4 level surfaces.

Since the refractive index of the collimator lens COL for the first wavelength $\lambda 1$ is 1.649231, one step $\Delta 1$ is shown as follows.

$$\Delta 1 = 7 \cdot 0.405/(1.649231-1) = 4.367 \; \mu m$$

Since optical path difference L added to the first light flux by step $\Delta 1$ is twice the first wavelength $\lambda 1$, the first light flux is transmitted as it is through the diffractive structure of a superposed type without being affected.

Since the refractive index of the collimator lens COL for the second wavelength $\lambda 2$ is 1.592675, optical path difference M added to the second light flux by step $\Delta 1$ is shown as follows;

$$M = 4.367 \times (1.592675-1)/0.655 = 3.95$$

and M is substantially 4 times the second wavelength $\lambda 2$ and the second light flux is also transmitted as it is through the diffractive structure of a superposed type without being affected.

On the other hand, since the refractive index of the collimator lens COL for the third wavelength $\lambda 3$ is 1.583833, optical path difference N added to the third light flux by step $\Delta 1$ is shown as follows;

$$N = 4.367 \times (1.583833-1)/0.785 = 3.24$$

and a phase difference of the third light flux passing through level surfaces around step $\Delta 1$ (a phase difference obtained by subtracting a multiple of an integer of $2\pi$ that generates the same phase optically) is $2\pi \times 0.24$. Since the number of level surfaces formed in one pattern is 4, a phase difference of the third light flux $4 \times 2\pi \times 0.24$ is almost $2\pi$, and first order diffracted light is generated.

The diffractive structure of a superposed type converts the third light flux entering the collimator lens COL by diffracting selectively only the third light flux, as stated above, and corrects spherical aberration caused by a protective layer thickness difference between BD and CD.

Diffraction efficiency of $0^{th}$ order diffracted light (transmitted light) of the first light flux generated by the diffractive structure of a superposed type is 100%, diffraction efficiency of $0^{th}$ order diffracted light (transmitted light) of the second light flux is 88.8% and diffraction efficiency of $1^{st}$ order diffracted light of the third light flux is 81.0%, which means that the diffraction efficiency is high for all light fluxes.

Incidentally, spherical aberration of the spot formed on information recording surface RL1 of BD can be corrected by moving collimator lens COL in the optical axis direction by means of uniaxial actuator AC2. Causes of generating spherical aberration to be corrected by position adjustment of collimator lens COL include, for example, wavelength fluctuations resulting from manufacturing errors of the first light source LD1, changes and distribution of refractive indexes of objective lens systems resulting from temperature changes, focus jump between information recording layers of multiple discs such as 2-layer disc and 4-layer disc, and thickness fluctuations and thickness distribution caused by manufacturing errors for protective layers of high density optical discs.

As a method to correct spherical aberration of the spot formed on information recording surface RL1 of BD, it is possible to use a phase control element employing liquid crystal, in addition to the method to move the lens in the optical axis direction mentioned above. Since the method to correct spherical aberration by the phase control element is widely known, detailed explanation is omitted here.

Though laser module LM for DVD and CD and violet semiconductor laser LD1 are used separately in the structure of the present embodiment, it is also possible to use a light source wherein a light-emission point emitting a light flux with one wavelength and another light-emission point emitting a light flux with another wavelength are formed on one chip, or a light source wherein light sources each emitting a light flux with different wavelength are housed in one casing, without being limited to the foregoing.

Further, when there is employed a structure wherein 3 actuators each being capable of pendulum-driving objective optical element OL are used in place of biaxial actuator AC1, and objective optical element OL is pendulum-driven, following tracking-driving of the objective optical element OL, when conducting recording and reproducing of information for CD, coma caused by inclination of the objective optical element OL and coma caused by tracking-driving of the objective optical element cancel each other, and excellent tracking characteristics are obtained constantly. In this case, it is preferable to provide a detecting means that determines the direction and an amount of pendulum-driving by detecting the direction and an amount of tracking-driving of the objective optical element OL.

Example 1

Next, an example will be explained as follows. Example 1 is one for an objective optical element which is suitable for the occasion wherein recording and reproducing of information can be conducted for both of BD and DVD. In the objective optical element of the present embodiment, a diffractive structure of a superposed type is used for the first phase structure, and a diffractive structure of a blazed type (serrated type) is used for the second phase structure. Table 1 shows lens data of Example 1.

TABLE 1

| Example 1 Lens data | | | | |
|---|---|---|---|---|
| Focal length of objective lens | | $f_1 = 2.2$ mm | $f_2 = 2.33$ mm | |
| Numerical aperture on image surface side | | NA1: 0.85 | NA2: 0.65 | |
| Magnification | | m1: 0 | m2: 0 | |
| $i^{th}$ surface | ri | di (408 nm) | ni (408 nm) | di (658 nm) | ni (658 nm) |
| 0 | ∞ | | | ∞ | |
| 1 (Aperture diameter) | | 0.0 ($\phi$3.74 mm) | | 0.0 ($\phi$3.00 mm) | |
| 2 | 1.51092 | 2.7218 | 1.56088 | 2.7218 | 1.54201 |
| 2' | 1.51114 | 0.0058 | | 0.0058 | |
| 3 | −4.34310 | 0.7220 | 1.00000 | 0.5167 | 1.00000 |
| 3' | −4.67662 | 0.0055 | | 0.0055 | |

TABLE 1-continued

| 4 | ∞ | 0.0875 | 1.61829 | 0.6000 | 1.57759 |
| 5 | ∞ | | | | |

* The symbol di' shows a displacement form $di^{th}$ surface to $d'^{th}$ surface.

$2^{nd}$ surface (0 mm ≦ h ≦ 1.5 mm)
Aspheric surface coefficient

| κ | −8.3863E−01 |
|---|---|
| A4 | 1.2349E−02 |
| A6 | 1.7825E−03 |
| A8 | 4.1590E−04 |
| A10 | −1.9456E−04 |
| A12 | 9.4628E−05 |
| A14 | −4.8971E−08 |
| A16 | −2.3937E−06 |

Optical path difference function (HD: $0^{th}$ order DVD: $1^{st}$ order Manufacturing wavelength 658 nm)

| C2 | 5.2068E−03 |
|---|---|
| C4 | −8.2816E−04 |
| C6 | −3.0096E−04 |
| C8 | 8.0071E−05 |
| C10 | −5.9393E−05 |

$2^{uth}$ surface (1.5 mm < h)
Aspheric surface coefficient

| κ | −8.5040E−01 |
|---|---|
| A4 | 1.1532E−02 |
| A6 | 1.4352E−03 |
| A8 | 5.3670E−04 |
| A10 | −1.0806E−04 |
| A12 | 9.5891E−05 |
| A14 | −1.2971E−05 |
| A16 | −1.8571E−06 |

$3^{rd}$ surface (0 mm ≦ h ≦ 0.724 mm)
Aspheric surface coefficient

| κ | −2.8463E+01 |
|---|---|
| A4 | 1.5123E−01 |
| A6 | −3.0848E−02 |
| A8 | 1.3536E−01 |
| A10 | 1.1740E−01 |
| A12 | −1.6602E−01 |
| A14 | −2.0101E−01 |
| A16 | 2.3207E−01 |

Optical path difference function (HD: $2^{nd}$ order DVD: $1^{st}$ order Manufacturing wavelength 408 nm)

| C2 | −2.6782E−02 |
|---|---|
| C4 | 1.4623E−02 |
| C6 | −5.8807E−02 |
| C8 | −3.3239E−02 |
| C10 | 2.9169E−02 |

$3^{uth}$ surface (0.724 mm < h)
Aspheric surface coefficient

| κ | −7.1366E+01 |
|---|---|
| A4 | 1.2626E−01 |
| A6 | −5.1193E−02 |
| A8 | −1.3075E−01 |
| A10 | 1.0554E−02 |
| A12 | −5.5870E−05 |
| A14 | −6.9040E−04 |
| A16 | −1.2880E−04 |

Optical path difference function (HD: $2^{nd}$ order DVD: $1^{st}$ order Manufacturing wavelength 408 nm)

| C2 | −3.3777E−02 |
|---|---|
| C4 | 3.6380E−03 |
| C6 | −7.9583E−03 |
| C8 | 3.6009E−03 |
| C10 | 2.6098E−04 |

Example 2

Example 2 is one for an objective optical element which is suitable for the occasion wherein the optical pickup device shown in FIG. 1 is made to be capable of conducting recording and/or reproducing of information for both of BD and DVD. In the objective optical element of the present embodiment, a diffractive structure of a blazed type (serrated type) is used for both of the first phase structure and the second phase structure. Table 2 shows lens data of Example 2.

TABLE 2

Example 2 Lens data

BD: Wavelength 408 nm, NA0.85, Aperture diameter 3.74 mm, Focal length 2.19 mm, Magnification m1 = 0
DVD: Wavelength 658 nm, NA0.65, Aperture diameter 2.92 mm, Focal length 2.28 mm, Magnification m2 = 0

(Paraxial data)

| Surface No. | r' (mm) | d(mm) | $N_{408}$ | $N_{658}$ | $n_d$ | $v_d$ | Remarks |
|---|---|---|---|---|---|---|---|
| OBJ | | d0 | | | | | Light-emission point |
| STO | | 0.0000 | | | | | Aperture |
| 1 | (Lower table) | 2.6100 | 1.56088 | 1.54201 | 1.54500 | 56.5 | Objective lens |
| 2 | (Lower table) | d1 | | | | | |
| 3 | ∞ | d2 | 1.61838 | 1.57729 | 1.58300 | 29.9 | Protective layer |
| 4 | ∞ | | | | | | |

$d0_{BD}$ = ∞, $d0_{DVD}$ = ∞, $d1_{BD}$ = 0.6955, $d1_{DVD}$ = 0.4595, $d2_{BD}$ = 0.0875, $d2_{DVD}$ = 0.6000

(Paraxial radius of curvature on the first surface, aspheric surface coefficient, diffraction order number, manufacturing wavelength, optical path difference function coefficient)

First surface

| | AREA1 (0 ≦ h ≦ 1.470) | AREA2 (1.470 ≦ h) |
|---|---|---|
| r | 0.16003E+01 | 0.14503E+01 |
| κ | −0.69759E+00 | −0.60683E+00 |
| A4 | 0.19073E−01 | 0.712373E−02 |
| A6 | 0.29142E−02 | 0.47259E−03 |
| A8 | 0.19191E−02 | 0.13594E−02 |
| A10 | −0.11345E−02 | −0.11580E−02 |
| A12 | 0.43871E−03 | 0.24480E−03 |
| A14 | 0.14121E−03 | 0.20431E−03 |
| A16 | −0.12241E−03 | −0.16629E−03 |
| A18 | 0.40143E−04 | 0.47056E−04 |
| A20 | −0.37526E−05 | −0.49059E−05 |
| dor1/dor2 | +2/+1 | +2/+1 |
| λB | 395 nm | 408 nm |
| C2 | −0.10408E−01 | −0.32198E−04 |
| C4 | 0.26118E−02 | 0.47110E−03 |
| C6 | 0.64061E−03 | −0.27645E−03 |
| C8 | −0.15882E−03 | −0.11577E−03 |
| C10 | 0.74834E−04 | −0.21487E−04 |
| C12 | 0.16438E−05 | 0.47998E−05 |

(Paraxial radius of curvature on the second surface, aspheric surface coefficient, diffraction order number, manufacturing wavelength, optical path difference function coefficient)

Second surface

| | AREA3 (0 ≦ h ≦ 0.705) | AREA4 (0.705 ≦ h) |
|---|---|---|
| r | −0.14000E+01 | −0.19885E+01 |
| κ | −0.99016E+01 | −0.57468E+02 |
| A4 | 0.19102E+00 | 0.12161E+00 |

TABLE 2-continued

| | | |
|---|---|---|
| A6 | 0.25038E+00 | −0.11229E+00 |
| A8 | 0.67639E−01 | 0.68498E−01 |
| A10 | −0.35295E−01 | −0.34503E−01 |
| A12 | 0.11623E−01 | 0.11666E−01 |
| A14 | −0.15094E−02 | −0.18233E−02 |
| A16 | −0.25902E−03 | −0.16008E−03 |
| A18 | 0.15519E−03 | 0.15519E−03 |
| A20 | −0.31407E−04 | −0.31407E−04 |
| dor1/dor2 | +10/+6 | +10/+6 |
| λB | 408 nm | 408 nm |
| C2 | 0.10902E−01 | −0.46731E−05 |
| C4 | −0.12436E−01 | 0.10324E−03 |
| C6 | −0.18154E−01 | −0.23946E−04 |
| C8 | −0.54043E−02 | 0.49847E−04 |
| C10 | 0.77483E−02 | 0.24277E−04 |
| C12 | 0.00000E+00 | −0.25523E−04 |

Example 3

Example 3 is one for an objective optical element which is suitable for the occasion wherein the optical pickup device shown in FIG. 1 is made to be capable of conducting recording and/or reproducing of information for BD, DVD and CD. In the objective optical element of the present embodiment, a diffractive structure of a blazed type (serrated type) is used for both of the first phase structure and the second phase structure. Table 3 shows lens data of Example 3.

TABLE 3

Example 3 Lens data

| | |
|---|---|
| HD: | Wavelength 405 nm, NA0.87, Aperture diameter 3.74 mm, Focal length 2.20 mm, Magnification m1 = 0 |
| DVD: | Wavelength 655 nm, NA0.65, Aperture diameter 2.82 mm, Focal length 2.29 mm, Magnification m2 = 0 |
| CD: | Wavelength 785 nm, NA0.49, Aperture diameter 2.20 mm, Focal length 2.25 mm, Magnification m3 = −0.079 |

(Paraxial data)

| Surface No. | r(mm) | d(mm) | $N_{405}$ | $N_{655}$ | $N_{785}$ | $n_d$ | $\nu_d$ | Remarks |
|---|---|---|---|---|---|---|---|---|
| OBJ | | d0 | | | | | | Light-emission point |
| STO | | 0.1000 | | | | | | Aperture |
| 1 | 1.7212 | 2.6500 | 1.59794 | 1.57686 | 1.57278 | 1.58000 | 55.0 | Objective lens |
| 2 | −5.1209 | d1 | | | | | | |
| 3 | ∞ | d2 | 1.62230 | 1.57995 | 1.57326 | 1.58546 | 29.9 | Protective layer |
| 4 | ∞ | | | | | | | |

$d0_{BD} = \infty$, $d0_{DVD} = \infty$, $d0_{CD} = 30.000$, $d1_{BD} = 0.6836$, $d1_{DVD} = 0.4599$, $d1_{CD} = 0.2130$
$d2_{BD} = 0.1000$, $d2_{DVD} = 0.6000$, $d2_{CD} = 1.2000$

| | First surface | Second surface |
|---|---|---|
| (Aspheric surface coefficient) | | |
| κ | −0.65304E+00 | −0.91636E+01 |
| A4 | 0.99796E−02 | 0.10223E+00 |
| A6 | 0.77332E−03 | −0.97621E−01 |
| A8 | 0.20940E−02 | 0.81146E−01 |
| A10 | −0.11988E−02 | −0.42512E−01 |
| A12 | 0.28323E−03 | 0.11361E−01 |
| A14 | 0.21358E−03 | −0.123931E−02 |
| A16 | −0.16956E−03 | 0.00000E+00 |
| A18 | 0.45165E−04 | 0.00000E+00 |
| A20 | −0.43064E−05 | 0.00000E+00 |
| (Optical path difference coefficient) | | |
| dor1/dor2/dor3 | +2/+1/+1 | +3/+2/+2 |
| λB | 405 nm | 405 nm |
| C2 | −0.12829E−01 | −0.80018E−02 |
| C4 | 0.11572E−02 | −0.80255E−02 |
| C6 | 0.36418E−03 | 0.38433E−03 |
| C8 | 0.11007E−03 | 0.35407E−03 |
| C10 | 0.18491E−04 | 0.69999E−04 |

Example 4

Example 4 is one for an objective optical element which is suitable for the occasion wherein the optical pickup device shown in FIG. 1 is made to be capable of conducting recording and/or reproducing of information for HD DVD, DVD and CD. In the objective optical element of the present embodiment, a diffractive structure of a blazed type (serrated type) is used for both of the first phase structure and the second phase structure. Table 4 shows lens data of Example 4.

TABLE 4

Example 4 Lens data

| | |
|---|---|
| HD: | Wavelength 405 nm, NA0.87, Aperture diameter 4.00 mm, Focal length 2.99 mm, Magnification m1 = 0 |
| DVD: | Wavelength 655 nm, NA0.65, Aperture diameter 3.96 mm, Focal length 3.05 mm, Magnification m2 = 0 |
| CD: | Wavelength 785 nm, NA0.47, Aperture diameter 2.80 mm, Focal length 3.04 mm, Magnification m3 = 0 |

(Paraxial data)

| Surface No. | r(mm) | d(mm) | $N_{405}$ | $N_{655}$ | $N_{785}$ | $n_d$ | $v_d$ | Remarks |
|---|---|---|---|---|---|---|---|---|
| OBJ | | ∞ | | | | | | Light-emission point |
| STO | | 0.0000 | | | | | | Aperture |
| 1 | 1.9543 | 2.3000 | 1.56702 | 1.54702 | 1.54316 | 1.55000 | 55.0 | Objective lens |
| 2 | −9.8737 | d1 | | | | | | |
| 3 | ∞ | d2 | 1.61950 | 1.57721 | 1.57042 | 1.58276 | 29.7 | Protective layer |
| 4 | ∞ | | | | | | | |

$d1_{HD}$ = 1.3813, $d1_{DVD}$ = 1.4347, $d1_{CD}$ = 1.0575, $d2_{HD}$ = 0.6000, $d2_{DVD}$ = 0.6000, $d2_{CD}$ = 1.2000

| | First surface | Second surface |
|---|---|---|
| (Aspheric surface coefficient) | | |
| κ | −0.75360E+00 | −0.82111E+02 |
| A4 | 0.31704E−02 | 0.19470E−01 |
| A6 | 0.46671E−03 | −0.51261E−02 |
| A8 | −0.11132E−03 | 0.53752E−03 |
| A10 | 0.33864E−04 | −0.13614E−04 |
| A12 | −0.47967E−05 | 0.00000E+00 |
| (Optical path difference coefficient) | | |
| dor1/dor2/dor3 | +2/+1/+1 | +3/+2/+2 |
| λB | 405 nm | 405 nm |
| C2 | 0.21212E−02 | −0.55686E−02 |
| C4 | −0.13977E−03 | −0.16757E−02 |
| C6 | −0.74642E−05 | 0.39867E−03 |
| C8 | −0.85522E−05 | −0.32364E−04 |
| C10 | 0.10475E−05 | −0.15612E−05 |

Example 5

Example 5 is one which is optimal as an optical system composed of an objective optical element and a collimator lens of the optical pickup device shown in FIG. 1. On the objective optical element of the present example, there is formed a blazed type (serrated diffractive structure) as a phase structure, and a superposed type diffractive structure is formed on the collimator lens. Table 5 shows lens data of Example 5.

TABLE 5

Example 5 Lens data

| | |
|---|---|
| BD: | Wavelength 405 nm, NA0.85, Aperture diameter 3.74 mm, Focal length 2.86 mm, Magnification m1 = 0 |
| DVD: | Wavelength 655 nm, NA0.65, Aperture diameter 2.90 mm, Focal length 2.62 mm, Magnification m2 = 0 |
| CD: | Wavelength 785 nm, NA0.51, Aperture diameter 2.42 mm, Focal length 2.29 mm, Magnification m3 = −0.12 |

(Paraxial data)

| Surface No. | r(mm) | d(mm) | $N_{405}$ | $N_{655}$ | $N_{785}$ | $n_d$ | $\nu_d$ | Remarks |
|---|---|---|---|---|---|---|---|---|
| OBJ | | d0 | | | | | | Light-emission point |
| 1 | −609.80 | 1.5000 | 1.64923 | 1.59268 | 1.58383 | 1.60000 | 23.0 | Collimator |
| 2 | −9.5948 | d1 | | | | | | lens |
| STO | | 0.1000 | | | | | | Aperture |
| 4 | 1.7658 | 2.6500 | 1.59794 | 1.57686 | 1.57278 | 1.58000 | 55.0 | Objective |
| 5 | −3.8522 | d2 | | | | | | lens |
| 6 | ∞ | d3 | 1.62230 | 1.57995 | 1.57326 | 1.58546 | 29.9 | Protective |
| 7 | ∞ | | | | | | | layer |

$d0_{BD} = 14.0770$, $d0_{DVD} = 15.4754$, $d0_{CD} = 15.4754$, $d1_{BD} = 5.0000$, $d1_{DVD} = 3.6017$, $d1_{CD} = 3.6017$, $d2_{BD} = 0.6674$, $d2_{DVD} = 0.4589$, $d2_{CD} = 0.2998$, $d3_{BD} = 0.1000$, $d3_{DVD} = 0.6000$, $d3_{CD} = 1.2000$ (Aspheric surface coefficient)

| | Second surface | Fourth surface | Fifth surface |
|---|---|---|---|
| κ | −0.12786E+01 | −0.62683E+00 | 0.39566E+00 |
| A4 | −0.96881E−04 | 0.10341E−01 | 0.99505E−01 |
| A6 | 0.00000E+00 | 0.11698E−02 | −0.96848E−01 |
| A8 | 0.00000E+00 | 0.22890E−02 | 0.81413E−01 |
| A10 | 0.00000E+00 | −0.11516E−02 | −0.42252E−01 |
| A12 | 0.00000E+00 | 0.29813E−03 | 0.11468E−01 |
| A14 | 0.00000E+00 | 0.21377E−03 | −0.11986E−02 |
| A16 | 0.00000E+00 | −0.16962E−03 | −0.20853E−04 |
| A18 | 0.00000E+00 | 0.45196E−04 | 0.00000E+00 |
| A20 | 0.00000E+00 | −0.428077E−05 | 0.00000E+00 |

(Optical path difference coefficient)

| | Second surface | Fourth surface |
|---|---|---|
| dor1/dor2/dor3 | 0/0/+1 | +2/+1/+1 |
| λB | 785 nm | 405 nm |
| C2 | 0.28855E−01 | −0.16111E−01 |
| C4 | 0.00000E+00 | 0.12615E−02 |
| C6 | 0.00000E+00 | 0.46951E−03 |
| C8 | 0.00000E+00 | 0.14268E−03 |
| C10 | 0.00000E+00 | 0.25277E−04 |

What is claimed is:

1. An objective optical element for use in an optical pickup apparatus which conducts reproducing and/or recording information by forming a converged spot on an information recording surface of a first optical information recording medium having a protective substrate thickness t1 with a first light flux of a first wavelength λ1 emitted from a first light source, and conducts reproducing and/or recording information by forming a converged spot on an information recording surface of a second optical information recording medium having a protective substrate thickness t2 (t1≦t2) with a second light flux of a second wavelength λ2 (λ1<λ2) emitted from a second light source, the objective optical element being:

an objective optical element which is commonly used for the first and the second optical information recording media, has 2 phase structures of a first phase structure and a second phase structure, and is a single lens whose at least one surface is aspheric surface, wherein the first phase structure corrects at least one of a spherical aberration due to a difference between the protective substrate thickness t1 and the protective substrate thickness t2 and a spherical aberration due to a difference between the first wavelength λ1 and the second wavelength λ2, and the second phase structure corrects at least one of a spherical aberration generated when the first wavelength λ1 is changed in a range of ±10 nm, a best image point movement generated when the first wavelength λ1 is changed in a range of ±10 nm, and a spherical aberration generated when environmental temperature is changed, wherein the first phase structure is a superimposed diffractive structure in which patterns whose sectional shape including the optical axis is a stair-shape, are concentric circularly arranged and steps are shifted by the height of the number of steps corresponding to the number of level surfaces for each of predetermined number of level surfaces, and the superimposed diffractive structure has a wavelength selectivity which does not diffract the first light flux, but diffracts the second light flux, and wherein a optical path difference added to the first light flux by a step difference of one of the superimposed diffractive structure is 2×λ1.

2. The objective optical element of claim 1, wherein the predetermined number of level surfaces is 5.

3. The objective optical element of claim 1, wherein the first phase structure is a saw-toothed diffractive structure, and the following expression is satisfied:

dor1>dor2, where dor1 is an even number, and where dor1 represents a diffraction order having the maximum diffracted light ray amount among diffracted light rays generated when the first light flux is incident on the saw-toothed diffractive structure, and dor2 represents a diffraction order having the maximum diffracted light ray amount among diffracted light rays generated when the second light flux is incident on the saw-toothed diffractive structure, and wherein the objective optical element converges; the dor1$^{th}$-order diffracted light ray of the first light flux on the information recording surface of the first optical information recording medium and the dor2$^{th}$-order diffracted light ray of the second light flux on the information recording surface of the second optical information recording medium.

4. The objective optical element of claim 3, wherein the diffraction order dor1 is 2 and the diffraction order dor2 is 1.

5. The objective optical element of claim 1, wherein the second phase structure is a saw-toothed diffractive structure, and the following expression is satisfied: dor1'>dor2', where dor1' is an even number, and where dor1' represents a diffraction order having the maximum diffracted light ray amount among diffracted light rays generated when the first light flux is incident on the saw-toothed diffractive structure, and dor2' represents a diffraction order having the maximum diffracted light ray amount among diffracted light rays generated when the second light flux is incident on the saw-toothed diffractive structure, and wherein the objective optical element converges the dor1'$^{th}$-order diffracted light ray of the first light flux on the information recording surface of the first optical information recording medium and converges the dor2'$^{th}$-order diffracted light ray of the second light flux on the information recording surface of the second optical information recording medium.

6. The objective optical element of claim 5, wherein the diffraction order dor1' is 2 and the diffraction order dor2' is 1.

7. The objective optical element of claim 5, wherein the diffraction order dor1' is 5 and the diffraction order dor2' is 3.

8. The objective optical element of claim 5, wherein the diffraction order dor1' is 10 and the diffraction order dor2' is 6.

9. The objective optical element of claim 1, wherein the second phase structure is an optical path difference providing structure, and when n is a natural number, an optical path difference added to the first light flux by the optical path difference providing structure is 5n times of the first wavelength λ1, and an optical path difference added to the second light flux by the optical path difference providing structure is 3n times of the second wavelength λ2.

10. The objective optical element of claim 1, wherein the first phase structure is formed on an optical surface on the light source side, and the second phase structure is formed on an optical surface on the optical information recording media side.

11. The objective optical element of claim 1, wherein when a designed magnification for the first wavelength is m1, and a designed magnification for the second wavelength is m2, it satisfies the following expression:

m1=m2=0.

12. The objective optical element of claim 1, wherein the objective optical element is made of low melting point glass whose transition point Tg is less than 400° C.

13. The objective optical element of claim 1, wherein the objective optical element is made of a resin.

14. The objective optical element of claim 1, wherein the objective optical element is formed in such a manner that resin layer is pasted together to a surface of glass-made lens, and on the surface of the resin layer, the first phase structure or the second phase structure is formed.

15. The objective optical element of claim 13, wherein particles whose sign of the refractive index change rate as temperature changes is reverse to that of the resin, and whose diameter is less than 30 nm are dispersed in the resin.

16. An optical pickup apparatus which conducts reproducing and/or recording information by forming a converged spot on an information recording surface of a first optical information recording medium having a protective substrate thickness t1 with a first light flux of a first wavelength λ1 emitted from a first light source, conducts reproducing and/or recording information by forming a converged spot on an information recording surface of a second optical information recording medium having a protective substrate thickness t2

($t1 \leq t2$) with a second light flux of a second wavelength $\lambda 2$ ($\lambda 1 < \lambda 2$) emitted from a second light source, and conducts reproducing and/or recording information by forming a converged spot on an information recording surface of a third optical information recording medium having a protective substrate thickness t3 ($t2 \leq t3$) with a third light flux of a third wavelength $\lambda 3$ ($\lambda 2 < \lambda 3$) emitted from a third light source, comprising:

an objective optical element of one group composition which is commonly used for the first to the third optical information recording media, which has a phase structure for correcting at least one of a spherical aberration due to a difference between the protective substrate thickness t1 and the protective substrate thickness t2 and a spherical aberration due to a difference between the first wavelength $\lambda 1$ and the first wavelength $\lambda 2$, and whose at least one surface is aspheric surface; and a diffractive optical element which is arranged in a common optical path of the first to third light fluxes, and has a superimposed diffractive structure in which patterns whose sectional shape including the optical axis is a stair-shape are concentric circularly arranged, and steps are shifted by the height for the number of steps corresponding to the number of level surfaces for each of predetermined number of level surfaces, and which has a wavelength selectivity for an diffraction action by which the first light flux and the second light flux are not diffracted, but the third light flux is diffracted, wherein the phase structure is a superimposed diffractive structure in which patterns whose sectional shape including the optical axis is a stair-shape are concentric circularly arranged and steps are shifted by the height of the number of steps corresponding to the number of level surfaces for each of predetermined number of level surfaces, and the superimposed type diffractive structure has a wavelength selectivity for a diffraction action by which the first light flux and the third light flux are not diffracted, but the second light flux is diffracted, and wherein an optical path difference added to the first light flux by a step difference for one of the superimposed diffractive structure is $2 \times \lambda 1$.

17. The optical pickup apparatus of claim 16, wherein the predetermined number of level surfaces is 5.

18. The optical pickup apparatus of claim 16, wherein the phase structure is a saw-toothed diffractive structure, and the following expression is satisfied: $odr1 > dor2 \geq dor3$, where dor1 is an even number, and where dor1 represents a diffraction order having the maximum diffracted light ray amount among diffracted light rays generated when the first light flux is incident on the saw-toothed diffractive structure, dor2 represents a diffraction order having the maximum diffracted light ray amount among diffracted light rays generated when the second light flux is incident on the saw-toothed diffractive structure, and dor3 represents a diffraction order having the maximum diffracted light ray amount among diffracted light rays generated when the third light flux is incident on the saw-toothed diffractive structure, and wherein the objective optical element converges the $dor1^{th}$-order diffracted light ray of the first light flux on the information recording surface of the first optical information recording medium; converges the $dor2^{th}$-order diffracted light ray of the second light flux on the information recording surface of the second optical information recording medium; and converges the $dor3^{th}$-order diffracted light ray of the third light flux on the information recording surface of the third optical information recording medium.

19. The optical pickup apparatus of claim 18, wherein the diffraction order dor1 is 2, the diffraction order dor2 is 1, and the diffraction order dor3 is 1.

20. The optical pickup apparatus of claim 16, wherein the phase structure is formed on the optical surface on the light source side of the objective optical element.

21. The optical pickup apparatus of claim 16, wherein the first light flux and the second light flux are incident on the objective optical element in the state of parallel light flux for the objective optical element.

22. The optical pickup apparatus of claim 16, wherein the objective optical element is made of low melting point glass whose transition point Tg is less than 400° C.

23. The optical pickup apparatus of claim 16, wherein the objective optical element is made of resin.

24. The optical pickup apparatus of claim 16, wherein the objective optical element is formed in such a manner that a resin layer is pasted together to a surface of a glass-made lens, and in the surface of the resin layer, the phase structure is formed.

25. The optical pickup apparatus of claim 23, wherein particles whose sign of the refractive index change rate as temperature changes is reverse to that of the resin, and whose diameter is less than 30 nm are dispersed in the resin.

26. The optical pickup apparatus of claim 16, further comprising:

a phase structure for correcting at least one of a spherical aberration generated when the first wavelength $\lambda 1$ is changed in a range of ±10 nm, a best image point movement generated when the first wavelength $\lambda 1$ is changed in a range of ±10 nm, and a spherical aberration generated when environmental temperature is changed.

27. The optical pickup apparatus of claim 16, wherein after the third light flux is converted to a divergent light flux by the superimposed type diffractive structure of the diffractive optical element, the third light flux enters into the objective optical element.

28. The optical pickup apparatus of claim 27, wherein Abbe's number in d-line of the superimposed type diffractive structure formed in the diffractive optical element is in a range of 40 to 80, and an optical path difference added to the first light flux by a step difference for one of the superimposed type diffractive structure is $5 \times \lambda 1$.

29. The optical pickup apparatus of claim 28, wherein the predetermined number of level surfaces of the superimposed type diffractive structure is 2.

30. The optical pickup apparatus of claim 27, wherein Abbe's number in d-line of the superimposed type diffractive structure formed in the diffractive optical element is in a range of 20 to 40, and an optical path difference added to the first light flux by the step difference for one of the superimposed type diffractive structure is $7 \times \lambda 1$.

31. The optical pickup apparatus of claim 30, wherein the predetermined number of level surfaces is 3 or 4.

32. The optical pickup apparatus of claim 27, wherein the diffractive optical element has a structure in which a material C whose Abbe's number in d-line is in a range of 45 to 65, and whose refractive index in d-line is in a range of 1.45 to 1.55, and a material D whose Abbe's number in d-line is in a range of 20 to 40, and whose refractive index in d-line is in a range of 1.55 to 1.70, are laminated in the optical axis direction, and the superimposed type diffractive structure is formed in an interface between the material C and the material D.

33. The optical pickup apparatus of claim 32, wherein an optical path difference added to the first light flux by a step difference for one of the superimposed type diffractive structure is $2 \times \lambda 1$.

34. The optical pickup apparatus of claim 33, wherein in the superimposed type diffractive structure of the diffractive optical element, the predetermined number of level surfaces is 5 or 6.

35. The optical pickup apparatus of claim 16, wherein the diffractive optical element is a coupling optical element by which the divergent angle of the first light flux is converted and made to enter to the objective optical element.

36. The optical pickup apparatus of claim 16, wherein the diffractive optical element is a beam expander by which the diameter of the first light flux is converted and made to enter to the objective optical element.

37. The optical pickup apparatus of claim 16, wherein the objective optical element conducts the tracking drive integrally with the diffractive optical element.

38. The optical pickup apparatus of claim 16, wherein the optical pickup apparatus has a chromatic aberration correction optical element which is arranged in an optical path between the first light source and the objective optical element and a diffractive structure for correcting a best image point movement of the objective optical element generated when the first wavelength $\lambda 1$ is changed in the range of $\pm 10$ nm, is formed on the chromatic aberration correction optical element.

39. The optical pickup apparatus of claim 38, wherein the chromatic correction optical element is the same optical element as the diffractive optical element.

40. The optical pickup apparatus of claim 38, wherein the optical pickup apparatus has a spherical aberration correction mechanism for correcting at least one of a spherical aberration generated in the objective optical element when the first wavelength $\lambda 1$ is changed in a range of $\pm 10$ nm and a spherical aberration generated in the objective optical element when environmental temperature is changed.

41. The optical pickup apparatus of claim 40, wherein the spherical aberration correction mechanism has a moving optical element to change an incident angle of a light flux on the objective optical element by moving in the optical axis direction and an actuator for moving the moving optical element in the optical axis direction.

42. The optical pickup apparatus of claim 41, wherein the moving optical element is the diffractive optical element.

43. The optical pickup apparatus of claim 40, wherein the spherical aberration correction mechanism is the liquid crystal element.

44. The optical pickup apparatus of claim 16, wherein the optical pickup apparatus further has an actuator for pendulum-driving the objective optical element, and when recording/reproducing information is conducted on the third optical information recording medium, the actuator pendulum-drives the objective optical element while following a tracking.

* * * * *